C. C. EVANS.
COMBINATION SPRING SUPPORT FOR THE REAR AXLES OF AUTOMOBILES.
APPLICATION FILED FEB. 12, 1917.

1,260,654.

Patented Mar. 26, 1918.

INVENTOR
CULLEN C. EVANS

ATTORNEYS

UNITED STATES PATENT OFFICE.

CULLEN C. EVANS, OF LOS ANGELES, CALIFORNIA.

COMBINATION SPRING-SUPPORT FOR THE REAR AXLES OF AUTOMOBILES.

1,260,654. Specification of Letters Patent. Patented Mar. 26, 1918.

Application filed February 12, 1917. Serial No. 148,153.

*To all whom it may concern:*

Be it known that I, CULLEN C. EVANS, a citizen of the United States, residing at Los Angeles, in the county of Los Angeles and State of California, have invented new and useful Improvements in Combination Spring-Supports for the Rear Axles of Automobiles, of which the following is a specification.

This invention relates to an automobile and particularly pertains to the construction of the rear axle therefor.

When the running gear of pleasure cars is used to carry a heavy load, or when it is positioned beneath the frame of a truck it is difficult to hold the rear axle housing so that it will stand the excessive strains. This is particularly true with rear axles having a vertically split housing bolted together along the vertical center of the axle. In such cases the axle housing will divide and permit grease and oil to leak therefrom. It is one of the objects of this invention to provide reinforcing stays which may be readily positioned upon axles of this particular design and which will act to truss the housing in a manner to prevent the separation of its parts under strain.

Another object of this invention is to adapt a rear axle normally having a single transverse spring extending the length of the axle so that side springs may be connected to and supported upon the axle.

Another object of this invention is to provide an axle end bearing which forms a continuation of the housing and which will rigidly support the truss members used in the construction.

Another object of this invention is to provide truss members which may be easily made from pressed metal and which will be sightly in their design and strong in construction.

It is a further object of this invention to provide a rear axle of the above description which may be readily assembled and thus permit a stock vehicle axle to be easily converted for use under heavier loads and more severe strains.

Other objects will appear hereinafter.

The invention is illustrated, by way of example, in the accompanying drawings in which.

Figure 1:
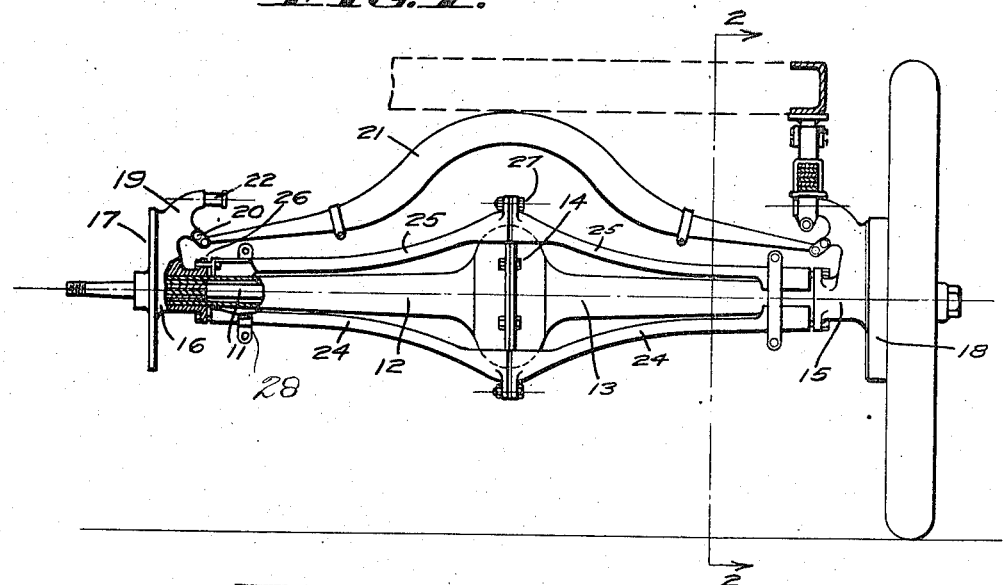
Figure 1 is a view in rear elevation illustrating an automobile axle as reinforced and provided with the special spring mounted over it, with which the present invention is concerned and further shown with parts broken away to particularly illustrate the manner in which the spring mounting and the axle trusses are connected.

Referring more particularly to the drawings, 10 indicates the frame of an automobile which is here shown as mounted at its rear end over a vehicle axle 11. This axle is incased within a primary housing comprising castings 12 and 13. These castings flare outwardly at their adjacent ends to form a differential case and are secured along bolting flanges by means of bolts 14. Mounted upon the outer ends of the housing formed by the parts 12 and 13 are combined brake flanges and spring hangers 15 and 16. These members are cast and have circular flanges 17 which close the openings within brake drums 18, as is common in vehicle construction. Cast integral with these flanges are spring perches 19. Each perch is fitted with two mountings, a lower mounting 20 for the end of the transverse spring 21 and an upper mounting 22 for a side spring 23. It is to be understood that these brake flange castings 15 and 16 are substitutes for the castings originally used upon the stock axle and that by their substitution the additional use of the side springs 23 may be had without weakening the axle parts or causing elaborate fittings to be mounted upon the original castings.

Figure 2:
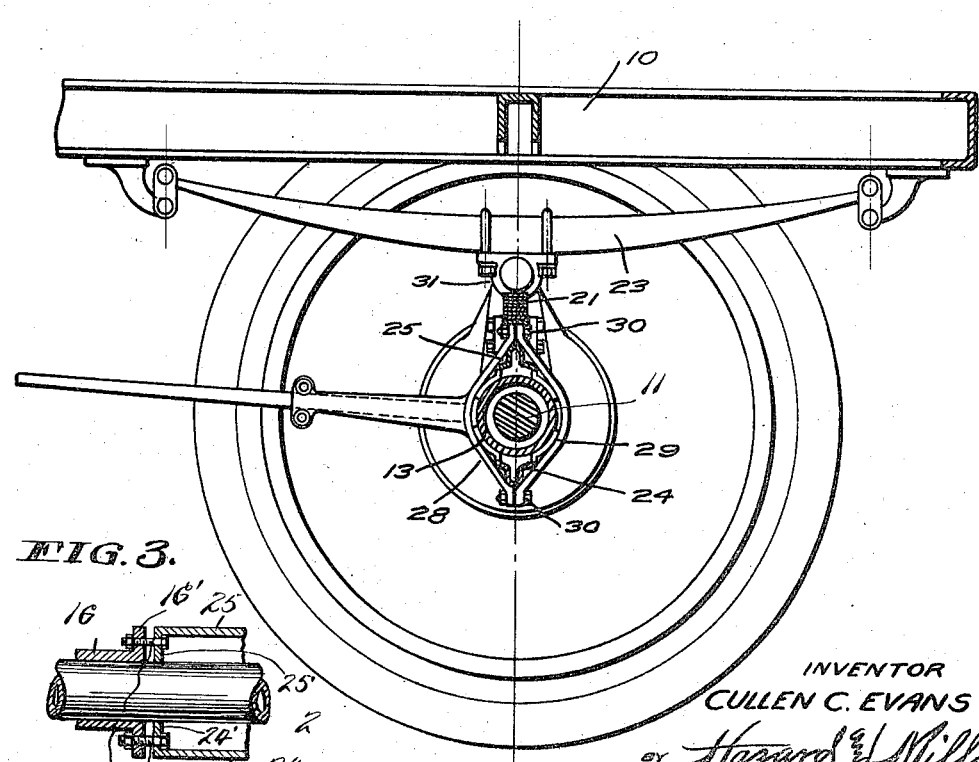
Fig. 2 is a view in vertical section as seen through the axle on the line 2—2 of Fig. 1 and discloses the detailed construction of the axle trusses and the side springs supported by the spring mountings.
Figure 3:
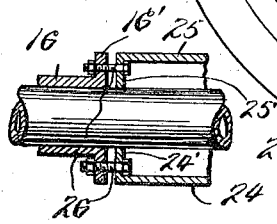
Fig. 3 is an enlarged sectional detail on the same plane as Fig. 1 and showing the take-up means by which the truss members are put under strain.

The inner ends of the castings 15 and 16 are formed with annular bolting flanges 16' to which the outer ends of the reinforcing housing are secured. This structure consists of pairs of pressed metal braces 24 and 25, the application of which is particularly disclosed in Fig. 1 of the drawings. These braces are of channel section, as shown in cross section of Fig. 2 and substantially conform to the outer configuration of the axle housings. The outwardly extending ends of the braces have flanges 24' and 25' which are secured above and below the axle housing by means of bolts 26 to the bolting flanges 16' formed on the inner ends of the brake flange castings. The adjacent ends of the braces are secured by bolts 27 which rigidly grip the ends and hold them in removable relation to the primary housing. As a means for tightening the reinforcing housing upon the primary housing, the brace members are formed short so as to allow strain upon them by the bolts 26. In order to rigidly hold the braces together and against the axle housing at their outer ends, binding straps 28 and 29 are provided. These straps pass along opposite sides of the braces and are secured by bolts 30, thus preventing a rattle of the parts.

In adapting the axle for use upon trucks or other heavy vehicles, the original stock axle is taken and its brake flange castings removed, after which the castings 15 and 16 are substituted therefor. The ends of the spring 21 are then secured by means of shackles to the perches 19. Spring seats 31 of side springs 23 are mounted upon the perches 19. The brace members 24 and 25 are then placed above and below the axle housing and are clamped together by means of the bolts 27; after which the outer ends are drawn toward the flanges of the castings 15 and 16 by means of bolts 26. When the reinforcing housing has been tightened so as to draw the primary housing in longitudinal alinement, the clamping members 28 and 29 are placed around the ends of the braces and secured by the bolts 30, thus forming a unitary structure.

It will thus be seen that the construction here disclosed will permit stock vehicle axles to be reinforced and readily adapted for use under heavier loads than those for which they are designed, and that the load will be provided with additional spring suspension without weakening the axle or its parts.

While I have shown the preferred construction of my reinforced vehicle axle as now known to me, it will be understood that various changes in the construction, combination and arrangement of parts may be made by those skilled in the art without departing from the spirit of my invention.

I claim:

1. In an automobile axle, the combination with an axle housing formed of complementary halves secured along their vertical transverse center, of brake castings mounted at the opposite ends of said housing, spring hangers formed integral with said castings and adapted to support the ends of a spring extending longitudinally of the axle, a superimposed hanger formed integral with each of the brake castings and adapted to support springs extending transversely of the axle, and reinforcing housing members secured at their outer ends to the brake castings and adapted to extend along opposite sides of the axle housing in a manner to reinforce it and hold the entire structure in a unitary manner.

2. In an axle construction, the combination with an axle housing, of bolting flanges at the opposite ends thereof, a pair of reinforcing braces disposed along the upper side of said axle, a complementary pair of braces disposed along the lower side of said axle, said braces being secured to each other adjacent the center of the axle, and means whereby the outer ends of said braces may be adjustably secured to the bolting flanges mounted upon the axle housing.

3. The combination with a primary axle housing, of bolting flanges rigidly mounted upon the ends of the primary axle housing, reinforcing housing members mounted above and below the primary axle housing and between the bolting flanges, and bolts connecting the ends of the reinforcing housing members to the bolting flanges so as to put the reinforcing housing members under strain.

4. The combination with a primary axle housing, of bolting flanges rigidly mounted upon the ends of the primary housing, reinforcing housing members mounted above and below the primary axle housing and being too short to fit between the bolting flanges, and bolts inserted through the ends of the reinforcing housing members and through the bolting flanges to put the reinforcing housing members under strain.

In testimony whereof I have signed my name to this specification.

CULLEN C. EVANS.

Copies of this patent may be obtained for five cents each, by addressing the "Commissioner of Patents, Washington, D. C."